United States Patent
Venu et al.

(10) Patent No.: US 8,260,805 B1
(45) Date of Patent: Sep. 4, 2012

(54) METHOD AND SYSTEM FOR CREATION OF AUTOMATIC CUSTOMER LISTS AND VIRTUAL RELATED FILE LISTINGS

(75) Inventors: Aravinth Venu, Fremont, CA (US); Lisa Jorgensen, Los Gatos, CA (US); Victoria Dolginsky, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/219,164

(22) Filed: Aug. 26, 2011

(51) Int. Cl.
*G06F 17/30* (2006.01)

(52) U.S. Cl. ........................................................ 707/769

(58) Field of Classification Search .................. 707/769, 707/999.3
See application file for complete search history.

(56) References Cited

U.S. PATENT DOCUMENTS

| 7,788,304 | B2 * | 8/2010 | Kotani | 707/829 |
| 8,150,728 | B1 * | 4/2012 | Bayer et al. | 705/14.1 |
| 2010/0287219 | A1 * | 11/2010 | Caso et al. | 707/827 |

* cited by examiner

*Primary Examiner* — Robert Beausoliel, Jr.
*Assistant Examiner* — Noosha Arjomandi
(74) *Attorney, Agent, or Firm* — McKay and Hodgson, LLP; Philip McKay

(57) ABSTRACT

A file management system is provided that is associated with one or more parent applications. One or more virtual file listing display parameters are selected and/or defined that determine how related files will be identified, grouped, and/or otherwise displayed, in a virtual file listing display. One or more data storage locations where the user stores existing client and/or project files are designated and then scanned. As a result of the scan, the user's clients, and/or projects, are identified and a user client list, and/or user project list, is generated. In addition, one or more related files, and/or documents, are identified, virtually grouped, and/or virtually displayed, based on the virtual file listing display parameters and then displayed via one or more virtual file listing displays associated with the file management system.

27 Claims, 6 Drawing Sheets

FIG. 5

QuickBooks File Manager 2011

Clients ▾ | Groups ▾ | Files ▾ | Password Vault ▾ | Batch Upgrade... | Options... | ? Help ▾

Clients

Groups: All My Clients ▾    Search 🔍

- Annies Apples
- Buffalo Bills
- Cahill Connection — 507
- Doggie Treats Galore
- Eugene Painting
- Fish Fry Friday
- Galloping Ponies
- Hallmark Cards
- Ingrid & Daughters
- Jelly Beans
- Kindercare Southlake
- Lilly Flowers
- Master Mechanic
- Nancie's Notions
- Olive's Olives
- Preston Painting
- Quest
- Rest Plus Annies Apples — 503

Current Groups ▾

Company Files

| File Name | Location | Last Modified ▾ | Version |
|---|---|---|---|
| AnniesApples.qbw | C:/Clients2010 | 1/23/2010 | QBAE2010 |
| AnniesApples.qbw | C:/Clients2010 | 4/15/2009 | QBAE2009 |
| AnniesApples.qbw | C:/Clients2009 | 3/02/2008 | QBAE2008 |

Accountant's Copy Files

| File Name | Location | Type | Created ▾ | Version |
|---|---|---|---|---|
| AnniesApples.qba | C:/Clients2010 | Accountant's Copy | 1/23/2010 | QBAE2010 |
| AnniesApples.qbx | C:/Clients2009 | Transfer In | 4/15/2009 | QBAE2009 |
| AnniesApples.qby | C:/Clients2008 | Transfer Out | 3/02/2009 | QBAE2008 |

Backup and Portable Files

| File Name | Location | Type | Created ▾ | Version |
|---|---|---|---|---|
| AnniesApples.qbb | C:/Clients2010 | Backup | 1/23/2010 | QBAE2010 |
| AnniesApples.qbm | C:/Clients2009 | Portable | 4/15/2009 | QBAE2009 |
| AnniesApples.qbm | C:/Clients2008 | Portable | 3/02/2009 | QBAE2008 |

Notes: Annies Apples still needs to provide their receipts for the month.

501    505

METHOD AND SYSTEM FOR CREATION OF AUTOMATIC CUSTOMER LISTS AND VIRTUAL RELATED FILE LISTINGS

BACKGROUND

Currently, numerous data processing systems and applications, herein referred to collectively as data processing applications" or "applications", are available to help users organize and process data. Examples of data processing applications include, but are not limited to, accounting and/or bookkeeping applications, tax preparation applications, healthcare expense tracking applications, docketing applications, etc.

Many of these data processing applications are used by "professional" users to create, organize, and store, multiple files, and/or documents, often for multiple clients, and/or for multiple projects. For instance, as one example, accountants often use a single accounting and/or bookkeeping application to create documents, files and/or folders for multiple different clients.

When a professional user implements a data processing application to obtain, receive, create, organize, and store, multiple documents, and/or files, for multiple clients, and/or for multiple projects, it is often critical that the user maintain an accurate listing of all of their client's, or active client's, and/or projects, and all of the files, and/or documents, associated with the user's clients, and/or projects. However, most users of data processing applications create their own unique data management and organizational scheme or structure to store files and documents in a data storage system, such as on/in one or more disk drives/hard drives, network drives, memories, etc., and these data management and organizational schemes are often redundant, spread across multiple data storage system locations and/or data storage systems, and often reflect the user's unique sense of order and structure which may, or may not, be intuitive to others.

For instance, it is typical for a user of a data processing application to save files, and/or documents, in data storage system memory locations/folders having names based, at least in part, on the name of the associated client or project. However, in addition, users of data processing applications often also save these files, and/or documents, in other data storage system memory locations/folders having names based on the version of the data processing application associated with the files, and/or documents, to help identify the files, and/or documents. In addition, the files, and/or documents, are often of different file, and/or document, types such as, but not limited to: a company file, and/or document; a backup file, and/or document; an account file, and/or document, etc. Therefore, in some cases, the user saves these files, and/or documents, in yet another set of memory locations/folders with names based on the type of file, and/or document, to be stored.

As a more specific example, it is often the case that an accountant using an accounting/bookkeeping application saves all the user's clients' files as data in a memory system, such as a hard drive, accessible by the accountant's/user's computing system. In addition, it is often the case that the accountant/user employs a data organizational scheme whereby a folder is created for each of the accountant's/user's client's files, and/or documents. In addition, the accountant/user may have clients using two or more versions of the accounting/bookkeeping application and, therefore, the accountant/user has folders for files, and/or documents, associated with each version of the accounting/bookkeeping application and/or sub-folders underneath the folders for each client. In this example, the accountant/user would typically name the folders, and/or sub-folders, after the client's name or their business name, or the associated project, and would likely also maintain both the current and older versions of the accountant's/user's clients' files, and/or documents, under a folder for each accounting/bookkeeping application version.

In this specific illustrative example, the result is that a given client's files, and/or documents, will often reside in multiple memory locations, and perhaps in multiple data storage systems. As a result, currently, it would be extremely difficult for the accountant/user to collect and correlate the client files, and/or documents, and use them to identify and/or create a client or project list, or identify, much less list, all the files, and/or documents, related to a specific client and/or or project. It would currently be even more difficult, if not impossible, to display the different types of files, and/or documents, and/or see how files, and/or documents, for a given client and/or project may be related to files, and/or documents, associated with other clients and/or projects.

In short, as discussed above, the fact that different users of data processing applications utilize different data storage and organization schemes, largely custom created by the users, to store files, and/or documents, means that currently it is often very difficult to automatically create accurate client lists and/or group/display files, and/or documents, for either a given client or project. Consequently, logical data grouping, display, and analysis is extremely difficult and must currently be performed largely on a manual basis. However, despite the difficulties created by their individual data storage and organization schemes, most users of data processing applications prefer their own data storage and organization schemes and do not want to have the actual data associated with their client's files, and/or documents, moved out of the data's current physical memory location, or have any changes made to their own underlying data organization and storage system.

What is needed is a method and system that allows for the automatic creation of client lists and listings of related files, and/or documents, that is based on actual data, files, and/or documents, and provides for various types of file listings and displays, all without physically changing the current memory location of the data representing the files, and/or documents, or making any changes to user's existing underlying data storage and organization system/scheme.

SUMMARY

In accordance with one embodiment, a method and system for automatic creation of customer lists and virtual file listing displays includes a process for automatic creation of customer lists and virtual file listing displays whereby, in one embodiment, a file management system is provided that is associated with one or more parent applications. In one embodiment, the file management system identifies, and/or groups, user files, and/or documents, created, processed, stored, or used by, the associated one or more parent applications. In one embodiment, the file management system provides one or more virtual file listings of the user files, and/or documents, through which a user can select and access the user files, and/or documents, in/from their original physical memory locations.

In one embodiment, the parent applications, and/or versions of the parent applications, associated with the virtual file listings are associated with their respective user files by the file management system and, in one embodiment, are also shown in the virtual file listings in the file management system. In one embodiment, the one or more parent applications associated with the listed user files can be opened/launched through the file management system when the associated user files are selected for access.

In one embodiment, a user is provided the capability to select a client list determination framework, in one embodiment, through the file management system. In one embodiment, the client list determination framework determines what general data organizational framework will be used to create the user's client list, and/or project list, and how related files, and/or documents, will be identified, grouped, and/or otherwise determined. As one illustrative example, a user may select an option to create a client list, and/or project list, based on folder names in the user's existing data storage and organization scheme, or data storage system, or based on file names in the user's existing data storage and organization scheme, or data storage system.

In one embodiment, one or more virtual file listing display parameters are selected and/or defined that determine how related files, and/or documents, will be identified, grouped, and/or otherwise displayed, in the virtual file listing display.

In various embodiments, the virtual file listing display parameters include, but are not limited to, any one or more of: virtual file listing display parameters indicating the files, and/or documents, are to be identified, grouped, and/or displayed, based, at least in part, on the client associated with the files, and/or documents; virtual file listing display parameters indicating the files, and/or documents, are to be identified, grouped, and/or displayed, based, at least in part, on the type of client associated with the files, and/or documents; virtual file listing display parameters indicating the files, and/or documents, are to be identified, grouped, and/or displayed, based, at least in part, on the subject matter of the files, and/or documents; virtual file listing display parameters indicating the files, and/or documents, are to be identified, grouped, and/or displayed, based, at least in part, on the business type, and/or the client type, associated with the files, and/or documents; virtual file listing display parameters indicating the files, and/or documents, are to be identified, grouped, and/or displayed, based, at least in part, on the size of the business, and/or client; virtual file listing display parameters indicating the files, and/or documents, are to be identified, grouped, and/or displayed, based, at least in part, on a time frame or trigger date; virtual file listing display parameters indicating the files, and/or documents, are to be identified, grouped, and/or displayed, based, at least in part, on a stage in an identified/associated process associated with the files, and/or documents; virtual file listing display parameters indicating the files, and/or documents, are to be identified, grouped, and/or displayed, based, at least in part, on results obtained; virtual file listing display parameters indicating the files, and/or documents, are to be identified, grouped, and/or displayed, based, at least in part, on the file, and/or document, type; virtual file listing display parameters indicating the files, and/or documents, are to be identified, grouped, and/or displayed, based, at least in part, on the version of the application associated with the file, and/or document; virtual file listing display parameters indicating the files, and/or documents, are to be identified, grouped, and/or displayed, based, at least in part, on access restrictions and/or allowed access to the files, and/or documents; and/or any other virtual file listing display parameters indicating how the related files, and/or documents, are to be identified, grouped, and/or displayed, and/or any combination of virtual file listing display parameters, as discussed herein, and/or known in the art at the time of filing, and/or as developed after the time of filing.

In one embodiment, one or more of the virtual file listing display parameters are selected and/or defined by the user of the method and system for automatic creation of customer lists and virtual file listing displays. In one embodiment, one or more of the virtual file listing display parameters are selected and/or defined by the provider of the method and system for automatic creation of customer lists and virtual file listing displays.

In one embodiment, the user designates one or more data storage systems, locations, and/or folders where the user stores the client and/or project files, documents, and/or data, that is/are to be scanned and/or processed by the method and system for automatic creation of customer lists and virtual file listing displays.

In one embodiment, the one or more designated data storage systems, locations, and/or folders are then scanned in accordance with the selected client list determination framework and using the one or more virtual file listing display parameters.

In one embodiment, as a result of the scan, the user's clients, and/or projects, are identified and a user client list, and/or user project list, is generated and, in one embodiment, is displayed through the file management system.

In one embodiment, as a result of the scan, one or more related files, and/or documents, are identified, virtually grouped, and/or virtually displayed, based on the defined, and/or selected, virtual file listing display parameters and, in one embodiment, displayed as one or more virtual file listing displays through the file management system. However, the physical memory locations of the data representing the files, and/or documents, listed in the one or more virtual file listing displays is not changed, nor is any change made to the user's existing underlying data storage and organization system/scheme.

Using the method and system for automatic creation of customer lists and virtual file listing displays, as discussed herein, client and/or project lists are automatically created based on actual data, files, and/or documents, in the user's data system. In addition, using the method and system for automatic creation of customer lists and virtual file listing displays, as discussed herein, customizable virtual related file listings are created to display listings of related files, and/or documents, without physically changing the current memory location of the data representing the files, and/or documents, or making any changes to user's existing underlying data storage and organization system/scheme.

BRIEF DESCRIPTION OF THE DRAWINGS

FIG. 5 is an illustrative example of a file management system virtual file listing display, as displayed on a display device of an exemplary user computing system, in accordance with one embodiment.

Figure 1:
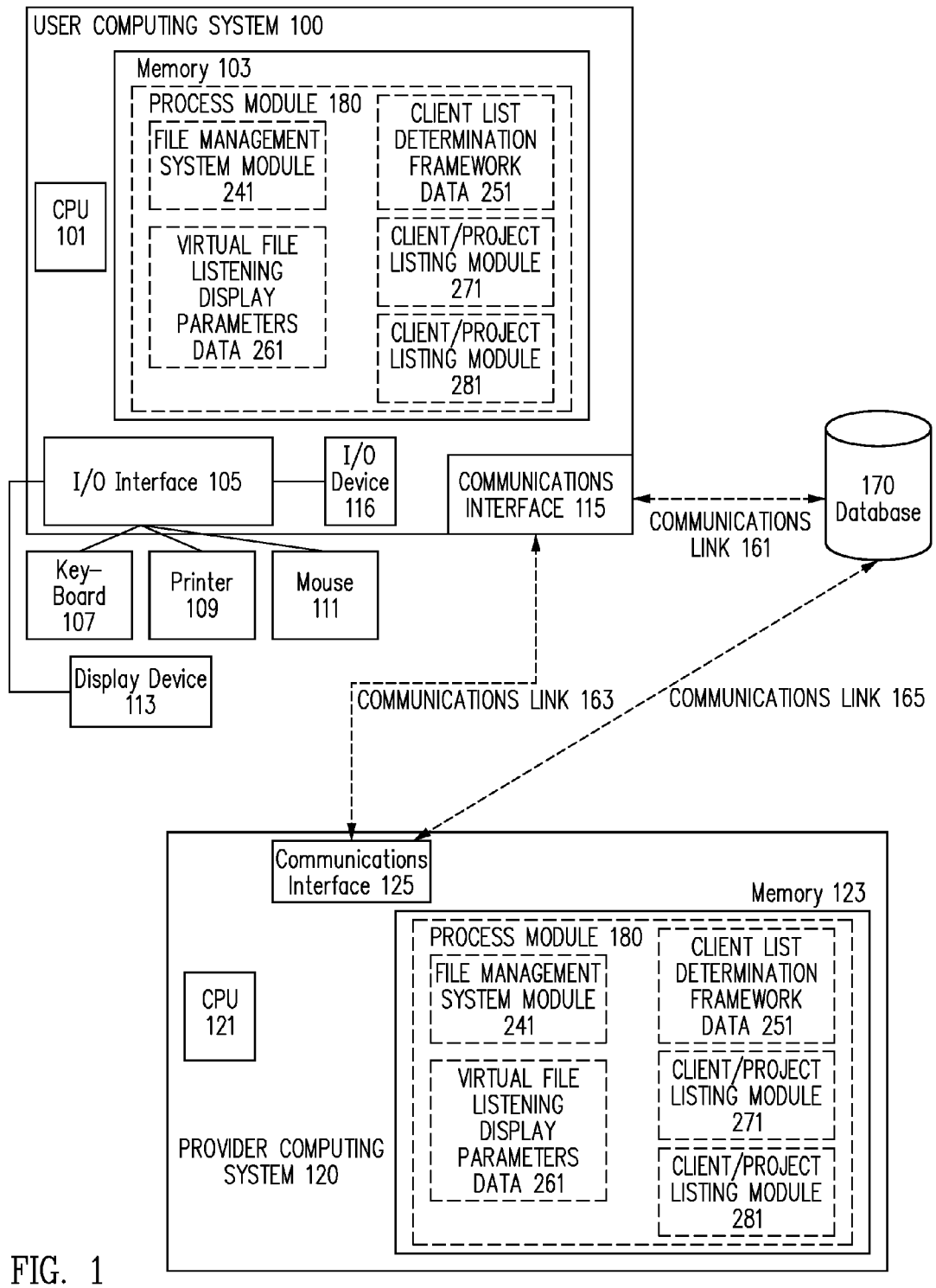
FIG. 1 is a block diagram of an exemplary hardware architecture for implementing one embodiment including a user computing system, a provider computing system, and a database, connected by various communications links/channels in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In accordance with one embodiment, a method and system for automatic creation of customer lists and virtual file listing displays includes a process for automatic creation of customer lists and virtual file listing displays whereby, in one embodiment, a file management system is provided.

In accordance with one embodiment, the file management system is provided on a user computing system. In accordance with one embodiment, the file management system is provided on a provider computing system.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the computing systems are connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the file management system is an application that identifies, collects, groups, and/or presents, multiple user files created by, provided by, stored by, and/or otherwise associated with, one or more parent applications.

In various embodiments, the file management system is associated with a single parent application and only user files created by one or more versions of the parent application are processed by the file management system. One specific illustrative example is Quickbooks File Manager™ available from Intuit, Inc. of Mountain View, Calif. that identifies, collects, groups, and presents multiple user files created using various versions of Quickbooks™, also available from Intuit, Inc. of Mountain View, Calif.

In various embodiments, the file management system is associated with multiple parent applications. In various embodiments, the parent applications can be any data management applications implemented on a computing system and/or accessed through a network.

As used herein, the terms "application", "data management application" and "parent application" are used interchangeably and include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-Line™, available from Intuit, Inc. of Mountain View, Calif.; Quicken™, available from Intuit, Inc. of Mountain View, Calif.; Quicken On-Line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

As discussed in more detail below, in one embodiment, the file management system provides a virtual file listing of the user files, and/or documents, processed by the file management system in one or more virtual file listing displays. In one embodiment, a user can select and access the user files, and/or documents, that reside in their original respective physical memory locations, through the one or more virtual file listing displays of the file management system. In one embodiment, a user can select and access the user files, and/or documents, through the one or more virtual file listing displays of the file management system via a user interface display and one or more user interface devices such as a keyboard, a mouse, a touchpad, voice recognition software, or any other mechanism or device for converting user actions into processor instructions and/or computer commands/actions.

In one embodiment, the parent applications, and/or versions of the parent applications, associated with the listed user files of the one or more virtual file listing displays are associated with their respective user files in the file management system and, in one embodiment, are also shown in the one or more virtual file listing displays in the file management system.

In one embodiment, the one or more virtual file listing displays in the file management system are "virtual" in that the actual files, and data, are represented, and can be linked to, but the actual files, and data, are not moved from their physical location in memory or their underlying file structure, i.e., data storage and organization scheme, or data storage system.

In one embodiment, the one or more parent applications associated with the listed user files in the one or more virtual file listing displays in the file management system can be opened/launched through the file management system when the associated user files are selected for access, and/or when the parent applications themselves are selected.

In one embodiment, a global file management user login/password is selected by, and/or assigned to, a user of the file management system. In one embodiment, the global file management user login/password is used by the user to access the file management system in response to a challenge/requirement from the file management system, typically made when signing into the file management system or when access to a file or parent application is requested.

In one embodiment, a user is provided the capability to select a client list determination framework through the file management system. In one embodiment, the client list determination framework determines what general data organizational framework will be used to create the user's client list, and/or project list, and how related files, and/or documents, will be identified, grouped, and/or otherwise determined.

As one illustrative example, a user may select an option to create a client list, and/or project list, based on folder names in the user's existing data storage and organization scheme, or data storage system. In one embodiment, the user can alternatively select an option to create a client list, and/or project list, based on file names in the user's existing data storage and organization scheme, or data storage system.

In one embodiment, a user is provided the capability to select a client list determination framework through the file management system via a user interface display and one or more user interface devices such as a keyboard, a mouse, a touchpad, voice recognition software, or any other mechanism or device for converting user actions into processor instructions and/or computer commands/actions.

In one embodiment, data representing the selected client list determination framework is stored under the direction of one or more processors associated with one or more computing systems.

In one embodiment, one or more virtual file listing display parameters are selected and/or defined that determine how related files, and/or documents, will be identified, grouped, and/or otherwise displayed, in the virtual file listing display.

In various embodiments, the virtual file listing display parameters include, but are not limited to, virtual file listing display parameters indicating the files, and/or documents, are to be identified, grouped, and/or displayed, based, at least in part, on the client associated with the files, and/or documents.

In various embodiments, the virtual file listing display parameters include, but are not limited to, virtual file listing display parameters indicating the files, and/or documents, are to be identified, grouped, and/or displayed, based, at least in part, on the project associated with the files, and/or documents.

In various embodiments, the virtual file listing display parameters include, but are not limited to, virtual file listing display parameters indicating the files, and/or documents, are to be identified, grouped, and/or displayed, based, at least in part, on the type of client, or project, associated with the files, and/or documents. For instance, as one specific illustrative example, files, and/or documents, associated with tax preparation clients are identified, grouped, and/or displayed in one virtual file listing while files, and/or documents, associated with bookkeeping clients are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on the subject matter of the files, and/or documents. For instance, as one specific illustrative example, files, and/or documents, that are profit and loss documents are identified, grouped, and/or displayed in one virtual file listing while files, and/or documents that are quarterly balance sheet documents are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on the business type, and/or the client type, associated with the files, and/or documents. For instance, as one specific illustrative example, files, and/or documents, associated with retail businesses or clients are identified, grouped, and/or displayed in one virtual file listing while files, and/or documents, associated with law practices or clients are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on the size of the business, and/or client. For instance, as one specific illustrative example, files, and/or documents, associated with 10 million dollar or more revenue businesses or clients are identified, grouped, and/or displayed in one virtual file listing while files, and/or documents, associated with 10 thousand dollar revenue or less businesses or clients are identified, grouped, and/or displayed in another virtual file listing. As another example, payroll files, and/or documents, associated with 20 or less employee businesses or clients are identified, grouped, and/or displayed in one virtual file listing while files, and/or documents, associated with 5,000 or more employee businesses or clients are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on a time frame, trigger/cut-off date, or threshold age. For instance, as one specific illustrative example, files, and/or documents, dated before a change in statutory regulations/forms/requirements are identified, grouped, and/or displayed in one virtual file listing while files, and/or documents, dated after a change in statutory regulations/forms/requirements are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on the stage of an identified/associated process to which the files, and/or documents, relate. For instance, as one specific illustrative example, files, and/or documents, associated with pending patent applications are identified, grouped, and/or displayed in one virtual file listing while files, and/or documents, associated with issued patents are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on results obtained. For instance, as one specific illustrative example, files, and/or documents, associated with abandoned patent applications are identified, grouped, and/or displayed in one virtual file listing while files, and/or documents, associated with issued patents are identified, grouped, and/or displayed in another virtual file listing.

In various embodiments, the virtual file listing display parameters include, but are not limited to, virtual file listing display parameters indicating the files, and/or documents, are to be identified, grouped, and/or displayed, based, at least in part, on the file, and/or document, type such as a company file, and/or document, a backup file, and/or document, an account file, and/or document, etc.

In various embodiments, the virtual file listing display parameters include, but are not limited to, virtual file listing display parameters indicating the files, and/or documents, are to be identified, grouped, and/or displayed, based, at least in part, on the version of the application associated with the file, and/or document.

In various embodiments, the virtual file listing display parameters include, but are not limited to, virtual file listing display parameters indicating the files, and/or documents, are to be identified, grouped, and/or displayed, based, at least in part, on access restrictions and/or allowed access to the files, and/or documents. For instance, as one specific illustrative example, files, and/or documents, that should be viewed, and/or made accessible, by administrative staff are identified, grouped, and/or displayed in one virtual file listing while files, and/or documents, that should be viewed, and/or made accessible, by managers are identified, grouped, and/or displayed in another virtual file listing.

In various embodiments, the virtual file listing display parameters include, but are not limited to, any other virtual file listing display parameters, or combinations of virtual file listing display parameters, indicating how the related files, and/or documents, are to be identified, grouped, and/or displayed, as discussed herein, and/or known in the art at the time of filing, and/or as developed after the time of filing.

In one embodiment, one or more virtual file listing display parameters are selected and/or defined by the user of the method and system for automatic creation of customer lists and virtual file listing displays. In one embodiment, one or more of the virtual file listing display parameters are selected and/or defined by the user of the method and system for automatic creation of customer lists and virtual file listing displays via a user interface display and one or more user interface devices such as a keyboard, a mouse, a touchpad, voice recognition software, or any other mechanism or device for converting user actions into processor instructions and/or computer commands/actions.

In one embodiment, one or more of the virtual file listing display parameters are selected and/or defined by the provider of the method and system for automatic creation of customer lists and virtual file listing displays.

In one embodiment, data representing the one or more virtual file listing display parameters is stored under the direction of one or more processors associated with one or more computing systems.

In one embodiment, the user designates one or more data storage systems, locations, and/or folders where the user stores the client and/or project files, documents, and/or data, that is to be scanned and/or processed by the method and system for automatic creation of customer lists and virtual file listing displays.

In one embodiment, the user designates one or more data storage systems, locations, and/or folders where the user stores the client and/or project files, documents, previously created by the user through the one or more associated data management applications. As noted above, in various embodiments, the user has previously stored the client and/or project files, documents, in one or more locations, and/or folders, associated one or more data storage systems using his, or her, own data storage and organization scheme.

As used herein, the term "data storage system" includes, but is not limited to, a hard drive, a disk drive, a network drive, any data storage device, a designated server system or computing system, or a designated portion of one or more server systems or computing systems, any database, or distributed database, or external and/or portable hard drive, and/or any dedicated mass storage device implemented in software, hardware, or a combination of hardware and software, a web-based data storage system, and/or any memory. Herein, a memory refers to a volatile memory, a non-volatile memory, or any combination of the two.

In one embodiment, the one or more designated data storage systems, locations, and/or folders, are then scanned in accordance with the selected client list determination framework and/or using the one or more virtual file listing display parameters.

In one embodiment, the one or more designated data storage systems, locations, and/or folders are scanned in accordance with the selected client list determination framework and/or using the one or more virtual file listing display parameters under the direction of one or more processors associated with one or more computing systems.

In one embodiment, as a result of the scan, the user's clients, and/or projects, are identified in accordance with the client list determination framework and a user client list, and/or user project list, is generated. In one embodiment, the user client list, and/or user project list is displayed through the file management system. In one embodiment, as a result of the scan, the user's clients, and/or projects, are identified in accordance with the client list determination framework and a user client list, and/or user project list, is generated under the direction of one or more processors associated with one or more computing systems.

In one embodiment, as a result of the scan, one or more related files, and/or documents, are identified, virtually grouped, and/or virtually displayed, based on the defined, and/or selected, virtual file listing display parameters. In one embodiment, as a result of the scan, one or more related files, and/or documents, are identified, virtually grouped, and/or virtually displayed, based on the defined, and/or selected, virtual file listing display parameters under the direction of one or more processors associated with one or more computing systems.

In one embodiment, the one or more related files, and/or documents, are identified, virtually grouped, and/or virtually displayed, in one or more virtual file listing displays through the file management system but the physical memory locations of the data representing the files, and/or documents, listed in the one or more virtual file listing displays is not changed, nor are any changes made to the user's existing underlying data storage and organization system/scheme.

In one embodiment, when a user selects one or more related files, and/or documents, listed in the one or more virtual file listing displays of the file management system to obtain access to the files, and/or documents, the associated parent application, and/or version of the application, for the selected files, and/or documents, is identified by the file management system and the correct parent application(s) is/are opened/launched automatically through the file management system. The data representing the selected files, and/or documents, is then accessed by the associated parent application, and/or version of the application, at/from the physical memory locations of the data representing the files, and/or documents, without changing the physical memory locations of the data representing the files, and/or documents, and without making any changes to the user's existing underlying data storage and organization system/scheme.

Those of skill in the art will readily recognize that the specific examples above were provided for illustrative purposes only and that numerous other uses and/or applications of the method and system for automatic creation of customer lists and virtual file listing displays are possible, and are envisioned. Consequently, the specific examples discussed above do not limit the scope of the claims presented below.

Hardware Architecture

FIG. 1 is a block diagram of an exemplary hardware architecture for implementing one embodiment of a system and method for automatic creation of customer lists and virtual file listing displays, such as exemplary process 300 discussed herein, that, returning to FIG. 2, includes: a user computing system 100, i.e., a first computing system; an optional provider computing system 120, e.g. a second computing system; and an optional database 170, all operatively coupled by communication links/channels 161, 163, and 165.

As noted above, herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As noted above, herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, user computing system includes a central processing unit (CPU) 101; an I/O interface 105; a communications interface 115; and a memory system 103 including process module 180.

Figure 2:
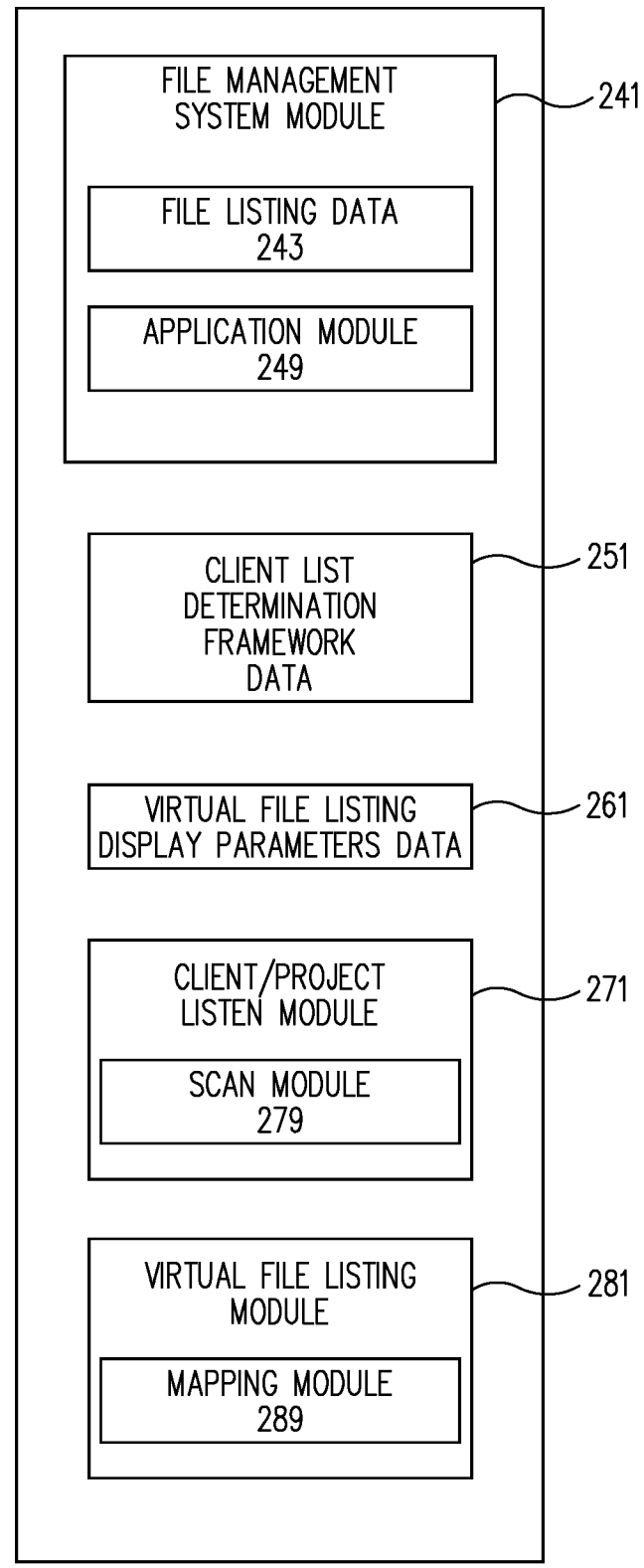
FIG. 2 is a block diagram of an exemplary memory system process module associated with the user computing system, and/or provider computing system, of FIG. 1, in accordance with one embodiment.

As seen in FIG. 2, user computing system 100 includes a display device 113. User computing system 100 may also include standard user interface devices such as a keyboard 107, a mouse 111, a touch pad (not shown) as well as, one or more standard input/output (I/O) devices 116. As seen in FIG. 2, user computing system 100 may further include/have access to a printer 109.

In one embodiment, user computing system 100 is connected, and/or otherwise operably coupled, to one or more communications links/channels, such as communications links/channels 161 and 163, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

As seen in FIG. 2, memory 103 includes process module 180. In one embodiment, process module 180 includes instructions and/or data for implementing a process for automatic creation of customer lists and virtual file listing displays, such as exemplary process 300. In one embodiment, process module 180 includes: file management system module 241; client list determination framework data 251; virtual file listing display parameters data 261; client/project listing module 271; and virtual file listing module 281.

Process module 180, file management system module 241; client list determination framework data 251; virtual file listing display parameters data 261; client/project listing module 271; and virtual file listing module 281 are discussed in more detail below with respect to FIG. 2.

Also shown in FIG. 1 is optional provider computing system 120. In various embodiments, provider computing system 120 is under the control of, accessible by, or otherwise associated with, a provider of process for automatic creation of customer lists and virtual file listing displays and is used to implement at least part of a process for automatic creation of customer lists and virtual file listing displays.

As shown in FIG. 1, provider computing system 120 typically includes a central processing unit (CPU) 121, communications interface 125, and a memory system 123, including process module 180.

In one embodiment, process module 180 includes instructions and/or data for implementing a process for automatic creation of customer lists and virtual file listing displays, such as exemplary process 300. In one embodiment, process module 180 includes: file management system module 241; client list determination framework data 251; virtual file listing display parameters data 261; client/project listing module 271; and virtual file listing module 281.

Process module 180, file management system module 241; client list determination framework data 251; virtual file listing display parameters data 261; client/project listing module 271; and virtual file listing module 281 are discussed in more detail below with respect to FIG. 2.

Provider computing system may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider computing system 120, whether available or known at the time of filing or as later developed.

In one embodiment, provider computing system 120 is representative of two or more computing systems. In one embodiment, provider computing system 120 is a client computing system associated with one or more server computing systems. In one embodiment, provider computing system 120 is a server computing system that is, in turn, associated with one or more client computing systems. In one embodiment, provider computing system 120 is part of a cloud computing environment.

In one embodiment, provider computing system 120 is operatively coupled to user computing system 100 via communications link/channel 163.

Also shown in FIG. 1 is database 170. In one embodiment, database 170 includes at least part of the application data associated with one or more parent applications, existing file, and/or documents, data previously created by a user, file management system data, the client list determination framework data, the virtual file listing display parameters data, the client/project listing data, and/or the virtual file listing data, as received from user computing system 100, via communications link/channel 161, and/or provider computing system 120, via communications link/channel 165.

In one embodiment, database 170 is a data storage device, a designated server system or computing system, or a designated portion of one or more server systems or computing systems, such as computing system(s) 100 and/or 120, or a distributed database, or an external and/or portable hard drive. In one embodiment, database 170 is a dedicated mass storage device implemented in software, hardware, or a combination of hardware and software.

In one embodiment, database 170 is a web-based function. As discussed in more detail below, in one embodiment, database 170 is under the control of, or otherwise accessible by, a process for automatic creation of customer lists and virtual file listing displays. In one embodiment, database 170 is part of a cloud computing environment.

In various embodiments, user computing system 100, and/or provider computing system 120, and/or database 170, are all operatively coupled by communication links/channels 161, 163, and 165. In various embodiments, any, or all, of communication links/channels 161, 163, and 165 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, user computing system 100, and/or provider computing system 120, and/or database 170, are part of any cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components of FIG. 1 may be located remotely from their respective system and accessed via any network, as discussed herein. In addition, the particular type of, and configuration of, user computing system 100, provider computing system 120, and database 170 are not relevant.

FIG. 2 shows a more detailed block diagram of process module 180 of FIG. 1. As seen in FIG. 2, process module 180 can store data and/or instructions associated with, but not limited to, a process for automatic creation of customer lists and virtual file listing displays, such as process 300 of FIG. 3.

As also seen in FIG. 2, process module 180 includes file management system module 241; client list determination framework data 251; virtual file listing display parameters data 261; client/project listing module 271; and virtual file listing module 281.

File management system module 241 includes procedures, data, and/or instructions, for implementing a file management system.

In accordance with one embodiment, the file management system of file management system module 241 is provided on user computing system 100. In accordance with one embodiment, the file management system of file management system module 241 is provided on provider computing system 120.

In one embodiment, the file management system of file management system module 241 is an application that identifies, collects, groups, and/or presents, multiple user files created by, provided by, stored by, and/or otherwise associated with, one or more parent applications as included in application module 249.

In various embodiments, the file management system of file management system module 241 is associated with a single parent application of application module 249 and only user files created by one or more versions of the parent application are processed by the file management system. One specific illustrative example is Quickbooks File Manager™ available from Intuit, Inc. of Mountain View, Calif. that identifies, collects, groups, and presents multiple user files created using various versions of Quickbooks™, also available from Intuit, Inc. of Mountain View, Calif.

In various embodiments, the file management system of file management system module 241 is associated with multiple parent applications of application module 249. In various embodiments, the parent applications can be any data management applications implemented on a computing system and/or accessed through a network.

As used herein, the terms "application", "data management application" and "parent application" are used interchangeably and include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-Line™, available from Intuit, Inc. of Mountain View, Calif.; Quicken™, available from Intuit, Inc. of Mountain View, Calif.; Quicken On-Line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In various embodiments, the file management system of file management system module 241 provides a virtual file listing of the user files, and/or documents, processed by the file management system in one or more virtual file listing displays of file listing data 243. In one embodiment, a user can select and access the user files, and/or documents, that reside in their original respective physical memory locations, through the one or more virtual file listing displays of the file management system. In one embodiment, a user can select and access the user files, and/or documents, through the one or more virtual file listing displays of the file management system via a user interface display and one or more user interface devices such as a keyboard, a mouse, a touchpad, voice recognition software, or any other mechanism or device for converting user actions into processor instructions and/or computer commands/actions.

In one embodiment, the parent applications, and/or versions of the parent applications, associated with the listed user files of the one or more virtual file listing displays are associated with their respective user files in the file management system and, in one embodiment, are also shown in the one or more virtual file listing displays in the file management system.

In one embodiment, one or more virtual file listing displays in the file management system are "virtual in the sense that the actual files, and data, are represented, and can be linked to, but the actual files, and data, are not moved from their physical location in memory or their underlying file structure, i.e., data storage and organization scheme, or data storage system.

In one embodiment, the one or more parent applications associated with the listed user files in the one or more virtual file listing displays in the file management system can be opened/launched through the file management system when the associated user files are selected for access, and/or when the parent applications themselves are selected.

In one embodiment, a global file management user login/password is selected by, and/or assigned to, a user of the file management system. In one embodiment, the global file management user login/password is used by the user to access the file management system in response to a challenge/requirement from the file management system, typically made when signing into the file management system or when access to a file or parent application is requested.

As also seen in FIG. 2, in one embodiment, process module 180 includes client list determination framework data 251 that includes procedures, data, and/or instructions, for providing a user the capability to select a client list determination framework through the file management system. In one embodiment, the client list determination framework determines what general data organizational framework will be used to create the user's client list, and/or project list, and how related files, and/or documents, will be identified, grouped, and/or otherwise determined.

As one illustrative example, a user may select an option to create a client list, and/or project list, based on folder names in the user's existing data storage and organization scheme, or data storage system of application module 249. In one embodiment, the user can alternatively select an option to create a client list, and/or project list, based on file names in the user's existing data storage and organization scheme, or data storage system of application module 249.

As also seen in FIG. 2, in one embodiment, process module 180 includes virtual file listing display parameters data 261 that includes procedures, data, and/or instructions, for selecting, storing, and using data indicating one or more virtual file listing display parameters selected and/or defined that determine how related files, and/or documents, will be identified, grouped, and/or otherwise displayed, in the virtual file listing display.

In various embodiments, the virtual file listing display parameters include, but are not limited to, any one or more of: virtual file listing display parameters indicating the files, and/or documents, are to be identified, grouped, and/or displayed, based, at least in part, on the client associated with the files, and/or documents; virtual file listing display parameters indicating the files, and/or documents, are to be identified, grouped, and/or displayed, based, at least in part, on the type of client associated with the files, and/or documents; virtual file listing display parameters indicating the files, and/or documents, are to be identified, grouped, and/or displayed, based, at least in part, on the subject matter of the files, and/or documents; virtual file listing display parameters indicating the files, and/or documents, are to be identified, grouped, and/or displayed, based, at least in part, on the business type, and/or the client type, associated with the files, and/or documents; virtual file listing display parameters indicating the files, and/or documents, are to be identified, grouped, and/or displayed, based, at least in part, on the size of the business, and/or client; virtual file listing display parameters indicating the files, and/or documents, are to be identified, grouped, and/or displayed, based, at least in part, on a time frame or trigger date; virtual file listing display parameters indicating the files, and/or documents, are to be identified, grouped, and/or displayed, based, at least in part, on a stage in an identified/associated process associated with the files, and/or documents; virtual file listing display parameters indicating the files, and/or documents, are to be identified, grouped, and/or displayed, based, at least in part, on results obtained; virtual file listing display parameters indicating the files, and/or documents, are to be identified, grouped, and/or displayed, based, at least in part, on the file, and/or document, type; virtual file listing display parameters indicating the files, and/or documents, are to be identified, grouped, and/or displayed, based, at least in part, on the version of the application associated with the file, and/or document; virtual file listing display parameters indicating the files, and/or documents, are to be identified, grouped, and/or displayed, based, at least in part, on access restrictions and/or allowed access to the files, and/or documents; and/or any other virtual file listing display parameters indicating how the related files, and/or documents, are to be identified, grouped, and/or displayed, and/or any combination of virtual file listing display parameters, as discussed herein, and/or known in the art at the time of filing, and/or as developed after the time of filing.

As also seen in FIG. 2, in one embodiment, process module 180 includes client/project listing module 271 that includes procedures, data, and/or instructions, for scanning user designated data, identifying the user's clients, and/or projects, and generating a user client list, and/or user project list.

In one embodiment, client/project listing module 271 includes scan module 279 that includes procedures, data, and/or instructions, for: obtaining and storing data designating one or more data storage systems, locations, and/or folders where the user stores the client and/or project files, documents, and/or data, such as data in application module 249 and/or in a database, such as database 170 of FIG. 1; and scanning the designated one or more data storage systems, locations, and/or folders in accordance with the selected client list determination framework data of client list determination framework data 251 and using one or more virtual file listing display parameters data of virtual file listing display parameters data 261.

As also seen in FIG. 2, in one embodiment, process module 180 includes virtual file listing module 281 that includes procedures, data, and/or instructions, for, as a result of the scan of client/project listing module 271, identifying, virtually grouping, and/or virtually displaying, one or more related files, and/or documents, as one or more virtual file listing displays through the file management system file management system module 241 based on the defined, and/or selected, virtual file listing display parameters of virtual file listing display parameters data 261. However, the physical memory locations of the data representing the files, and/or documents, listed in the one or more virtual file listing displays is not changed, nor is any change made to the user's existing underlying data storage and organization system/scheme.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

Process

In accordance with one embodiment, a process for automatic creation of customer lists and virtual file listing displays includes providing a file management system is that is associated with one or more parent applications. In one embodiment, one or more virtual file listing display parameters are selected and/or defined that determine how related files will be identified, grouped, and/or otherwise displayed, in a virtual file listing display associated with the file management system.

In one embodiment, one or more data storage systems, locations, and/or folders where the user stores existing client and/or project files are designated and the one or more designated data storage systems, locations, and/or folders are scanned in accordance with a selected client list determination framework and/or using the one or more virtual file listing display parameters.

In one embodiment, as a result of the scan, the user's clients, and/or projects, are identified in accordance with the client list determination framework and a user client list, and/or user project list, is generated. In one embodiment, the user client list, and/or user project list is displayed through the file management system.

In one embodiment, as a result of the scan, one or more related files, and/or documents, are identified, virtually grouped, and/or virtually displayed, based on the defined, and/or selected, virtual file listing display parameters.

In one embodiment, the one or more related files, and/or documents, are identified, virtually grouped, and/or virtually displayed, in one or more virtual file listing displays through the file management system but the physical memory locations of the data representing the files, and/or documents, listed in the one or more virtual file listing displays is not changed, nor are any changes made to the user's existing underlying data storage and organization system/scheme.

In one embodiment, when a user selects one or more related files, and/or documents, listed in the one or more virtual file listing displays of the file management system to obtain access to the files, and/or documents, the associated parent application, and/or version of the application, for the selected files, and/or documents, is identified by the file management system and the correct parent application(s) is/are opened/launched automatically through the file management system. The data representing the selected files, and/or documents, is then accessed by the associated parent application, and/or version of the application, at/from the physical memory locations of the data representing the files, and/or documents, without changing the physical memory locations of the data representing the files, and/or documents, and without making any changes to the user's existing underlying data storage and organization system/scheme.

Figure 3:
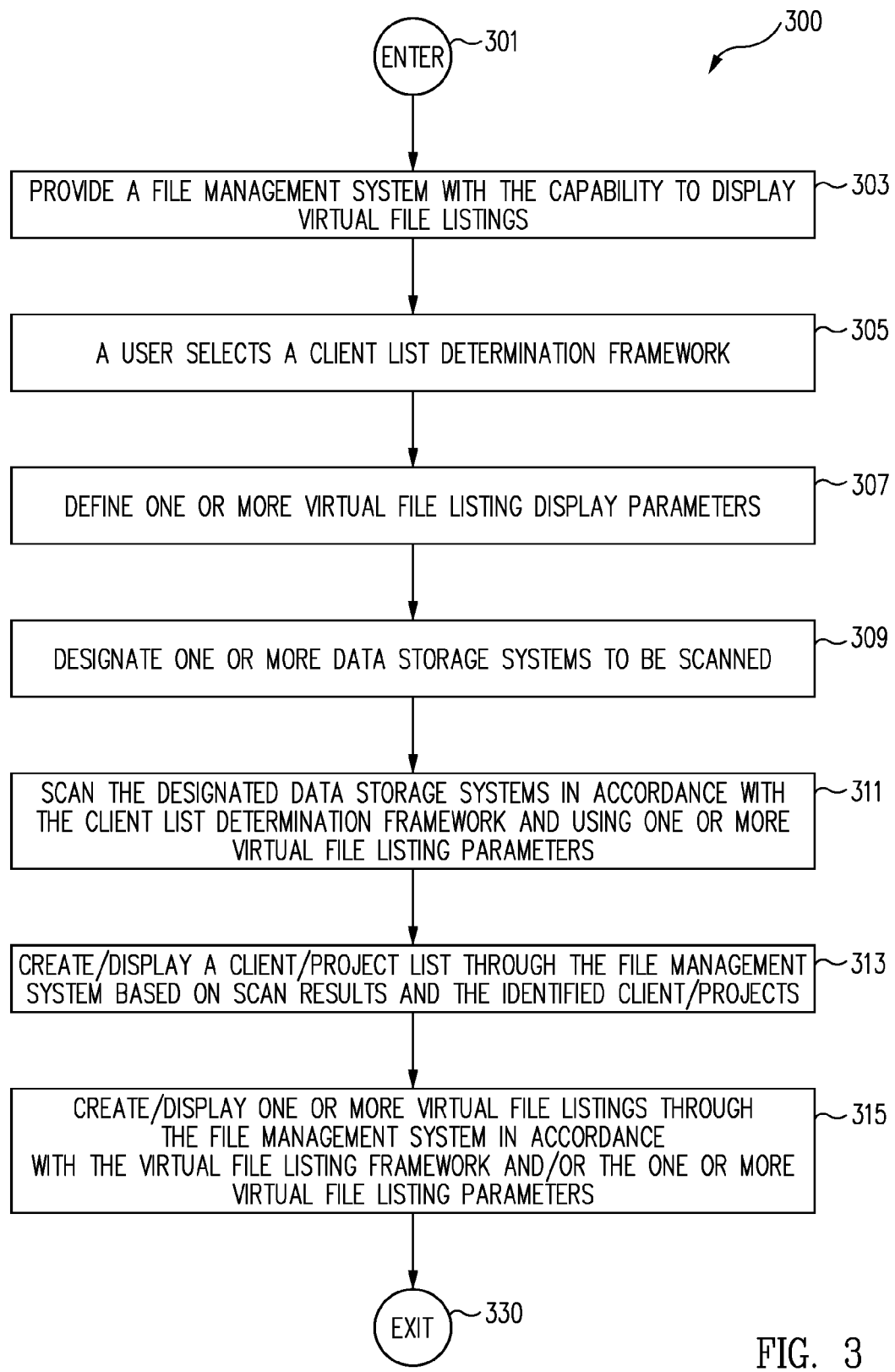
FIG. 3 is a flow chart depicting one embodiment of a process for automatic creation of customer lists and virtual file listing displays in accordance with one embodiment.

FIG. 3 is a flow chart depicting a process for automatic creation of customer lists and virtual file listing displays 300 in accordance with one embodiment.

Process for automatic creation of customer lists and virtual file listing displays 300 begins at ENTER OPERATION 301 of FIG. 3 and process flow proceeds to PROVIDE A FILE MANAGEMENT SYSTEM WITH THE CAPABILITY TO DISPLAY VIRTUAL FILE LISTINGS OPERATION 303.

In one embodiment, at PROVIDE A FILE MANAGEMENT SYSTEM WITH THE CAPABILITY TO DISPLAY VIRTUAL FILE LISTINGS OPERATION 303 a file management system is provided.

In accordance with one embodiment, at least part of the file management system is provided at PROVIDE A FILE MANAGEMENT SYSTEM WITH THE CAPABILITY TO DISPLAY VIRTUAL FILE LISTINGS OPERATION 303 on a user computing system, such as user computing system 100 of FIG. 1.

Returning to FIG. 3, in accordance with one embodiment, at least part of the file management system is provided at PROVIDE A FILE MANAGEMENT SYSTEM WITH THE CAPABILITY TO DISPLAY VIRTUAL FILE LISTINGS OPERATION 303 on a provider computing system, such as provider computing system 120 of FIG. 1.

As noted above, as used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the computing systems are connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 3, in one embodiment, the file management system of PROVIDE A FILE MANAGEMENT SYSTEM WITH THE CAPABILITY TO DISPLAY VIRTUAL FILE LISTINGS OPERATION 303 is an application that identifies, collects, groups, and/or presents, multiple user files created by, provided by, stored by, and/or otherwise associated with, one or more parent applications.

In various embodiments, the file management system of PROVIDE A FILE MANAGEMENT SYSTEM WITH THE CAPABILITY TO DISPLAY VIRTUAL FILE LISTINGS OPERATION 303 is associated with a single parent application and only user files created by one or more versions of the parent application are processed by the file management system.

One specific illustrative example of a single application file management system is Quickbooks File Manager™ available from Intuit, Inc. of Mountain View, Calif. that identifies, collects, groups, and presents multiple user files created using various versions of Quickbooks™, also available from Intuit, Inc. of Mountain View, Calif.

In various embodiments, the file management system of PROVIDE A FILE MANAGEMENT SYSTEM WITH THE CAPABILITY TO DISPLAY VIRTUAL FILE LISTINGS OPERATION 303 is associated with multiple parent applications. In various embodiments, the parent applications can be any data management applications implemented on a computing system and/or accessed through a network.

As noted above, herein, the terms "application", "data management application" and "parent application" are used interchangeably and include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-Line™, available from Intuit, Inc. of Mountain View, Calif.; Quicken™, available from Intuit, Inc. of Mountain View, Calif.; Quicken On-Line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In one embodiment, the file management system of PROVIDE A FILE MANAGEMENT SYSTEM WITH THE CAPABILITY TO DISPLAY VIRTUAL FILE LISTINGS OPERATION 303 provides a virtual file listing of the user files, and/or documents, processed by the file management system in one or more virtual file listing displays.

In one embodiment, the file management system of PROVIDE A FILE MANAGEMENT SYSTEM WITH THE CAPABILITY TO DISPLAY VIRTUAL FILE LISTINGS OPERATION 303 allows a user to select and access the user files, and/or documents, that reside in their original respective physical memory locations, through the one or more virtual file listing displays of the file management system.

In one embodiment, the parent applications, and/or versions of the parent applications, associated with the listed user files in the one or more virtual file listing displays of the file management system are associated with their respective user files by the file management system of PROVIDE A FILE MANAGEMENT SYSTEM WITH THE CAPABILITY TO DISPLAY VIRTUAL FILE LISTINGS OPERATION 303 and, in one embodiment, are also shown in the one or more virtual file listing displays of the file management system of PROVIDE A FILE MANAGEMENT SYSTEM WITH THE CAPABILITY TO DISPLAY VIRTUAL FILE LISTINGS OPERATION 303.

In one embodiment, the one or more virtual file listing displays in the file management system of PROVIDE A FILE MANAGEMENT SYSTEM WITH THE CAPABILITY TO DISPLAY VIRTUAL FILE LISTINGS OPERATION 303 are virtual file listing displays meaning that the actual files, and data, are represented, and can be linked to, but the actual files, and data, are not moved from their physical location in memory or their underlying file structure.

As discussed in more detail below, in one embodiment, the one or more parent applications associated with the listed user files in the one or more virtual file listing displays in the file management system can be opened/launched through the file management system of PROVIDE A FILE MANAGEMENT SYSTEM WITH THE CAPABILITY TO DISPLAY VIRTUAL FILE LISTINGS OPERATION 303 when the associated user files are selected for access, and/or when the parent applications themselves are selected.

In one embodiment, a user can select and access the user files in the one or more virtual file listing displays of the file management system of PROVIDE A FILE MANAGEMENT SYSTEM WITH THE CAPABILITY TO DISPLAY VIRTUAL FILE LISTINGS OPERATION 303 via a user interface display.

FIG. 5 shows one illustrative example of a virtual file listing display 503 provided as part of a file manager display 501 provided at PROVIDE A FILE MANAGEMENT SYSTEM WITH THE CAPABILITY TO DISPLAY VIRTUAL FILE LISTINGS OPERATION 303.

As seen in FIG. 5, virtual file listing display 503 includes virtual file listings, such as exemplary virtual file listing 505 that include the name of the file, the physical location of the file, the last modified date associated with the file, and the application type and version that created, uses, and/or is associated with, the file.

As also seen in FIG. 5, in this specific illustrative example, virtual file listing display 503 includes file listings grouped by the associated client and file type using one or more virtual file listing display parameters as discussed in more detail below.

Those of skill in the art will readily recognize that FIG. 5 shows but one example of a file manager display 501 and virtual file listing display 503. Consequently, FIG. 5 is presented and discussed for illustrative purposes and is not intended to limit the scope of the claims presented below.

Returning to FIG. 3, in various embodiments, a user can select and access the user files in the user file listing of the file management system of PROVIDE A FILE MANAGEMENT SYSTEM WITH THE CAPABILITY TO DISPLAY VIRTUAL FILE LISTINGS OPERATION 303 via a user interface display, such as virtual file listing display 503 of FIG. 5, and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 3, in one embodiment, a global file management user login/password is selected by, and/or assigned to, a user of the file management system of PROVIDE A FILE MANAGEMENT SYSTEM WITH THE CAPABILITY TO DISPLAY VIRTUAL FILE LISTINGS OPERATION 303. In one embodiment, the global file management user login/password is used by the user to access the file management system in response to a challenge/requirement from the file management system, typically made when signing into the file management system or when access to a file or parent application is requested.

Returning to FIG. 3, once a file management system is provided at PROVIDE A FILE MANAGEMENT SYSTEM WITH THE CAPABILITY TO DISPLAY VIRTUAL FILE LISTINGS OPERATION 303, process flow proceeds to A USER SELECTS A CLIENT LIST DETERMINATION FRAMEWORK OPERATION 305.

In one embodiment, at A USER SELECTS A CLIENT LIST DETERMINATION FRAMEWORK OPERATION 305 a user is provided the capability to select a client list determination framework through the file management system of PROVIDE A FILE MANAGEMENT SYSTEM WITH THE CAPABILITY TO DISPLAY VIRTUAL FILE LISTINGS OPERATION 303.

In one embodiment, the client list determination framework data of A USER SELECTS A CLIENT LIST DETERMINATION FRAMEWORK OPERATION 305 determines what general data organizational framework will be used to create the user's client list, and/or project list, and how related files, and/or documents, will be identified, grouped, and/or otherwise determined.

As one illustrative example, a user may select an option at A USER SELECTS A CLIENT LIST DETERMINATION FRAMEWORK OPERATION 305 to create a client list, and/or project list, based on folder names in the user's existing data storage and organization scheme, or data storage system. In one embodiment, at A USER SELECTS A CLIENT LIST DETERMINATION FRAMEWORK OPERATION 305 the user can alternatively select an option to create a client list, and/or project list, based on file names in the user's existing data storage and organization scheme, or data storage system. In one embodiment, a user is provided the capability to select a client list determination framework through the file management system at A USER SELECTS A CLIENT LIST DETERMINATION FRAMEWORK OPERATION 305 via a client list determination framework selection interface display.

Figure 4:
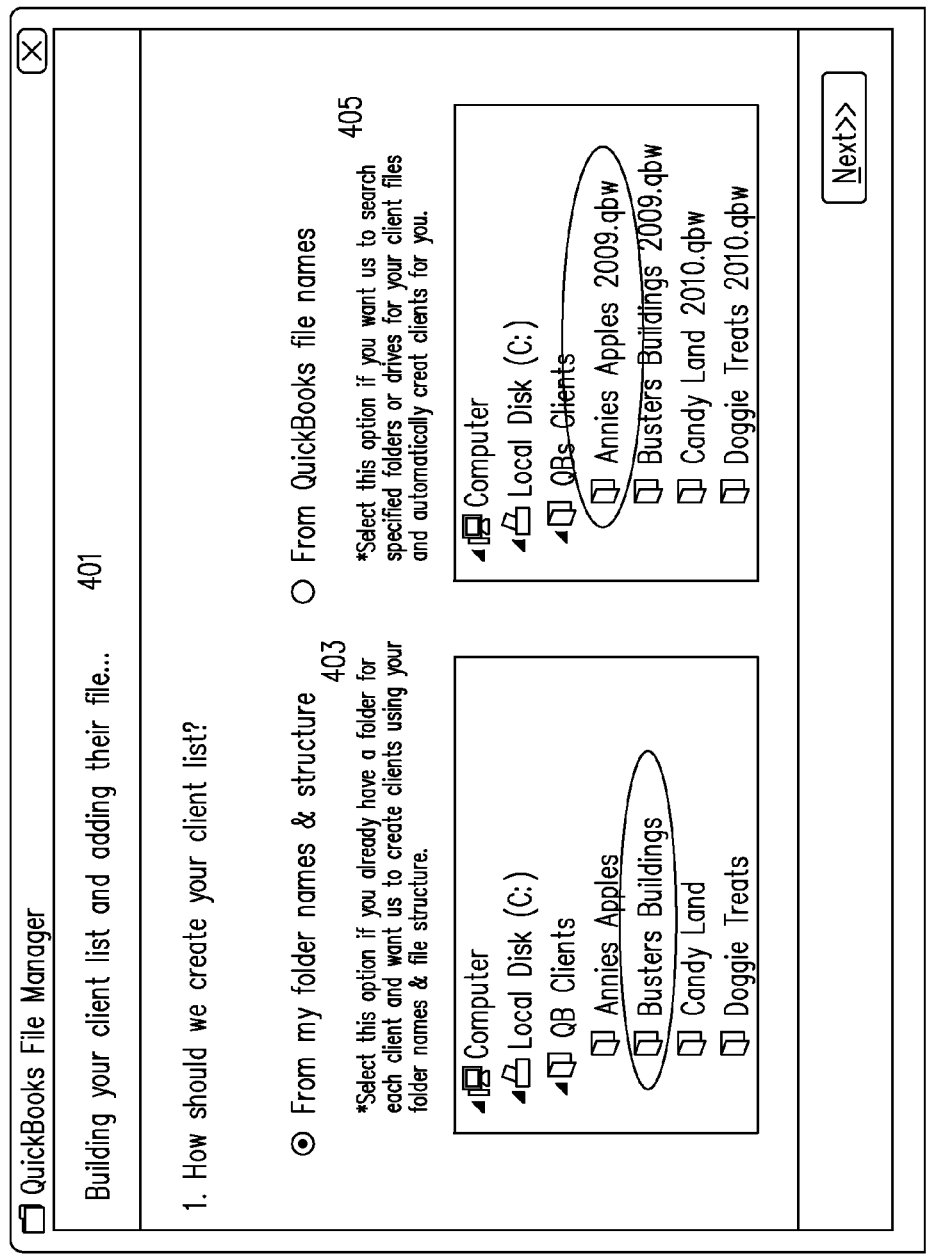
FIG. 4 is an illustrative example of a user interface display for selecting a client list determination framework in accordance with one embodiment.

FIG. 4 shows one illustrative example of one embodiment, of a client list determination framework selection interface display 401. As seen in FIG. 4, client list determination framework selection interface display 401 allows a user to select the option to create a client list, and/or project list, based on folder names in the user's existing data storage and organization scheme, or data storage system, at from my folder names and structure option 403. As seen in FIG. 4, client list determination framework selection interface display 401 allows a user to select the option to create a client list, and/or project list, based on file names in the user's existing data storage and organization scheme, or data storage system, at from Quickbooks file names option 405, i.e., from file names created through the parent data processing application.

Those of skill in the art will readily recognize that FIG. 4 shows but one example of a client list determination framework selection interface display 401. Consequently, FIG. 4 is presented and discussed for illustrative purposes and is not intended to limit the scope of the claims presented below.

Returning to FIG. 3, in one embodiment, a user is provided the capability to select a client list determination framework through the file management system at A USER SELECTS A CLIENT LIST DETERMINATION FRAMEWORK OPERATION 305 via a user interface display, such as client list determination framework selection interface display 401, and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

In one embodiment, data representing the selected client list determination framework is stored under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 3, once a user is provided the capability to select a client list determination framework through the file management system of PROVIDE A FILE MANAGEMENT SYSTEM WITH THE CAPABILITY TO DISPLAY VIRTUAL FILE LISTINGS OPERATION 303 at A USER SELECTS A CLIENT LIST DETERMINATION FRAMEWORK OPERATION 305, process flow proceeds to DEFINE ONE OR MORE VIRTUAL FILE LISTING DISPLAY PARAMETERS OPERATION 307.

In one embodiment, at DEFINE ONE OR MORE VIRTUAL FILE LISTING DISPLAY PARAMETERS OPERATION 307 one or more virtual file listing display parameters are selected and/or defined that determine how related files, and/or documents, will be identified, grouped, and/or otherwise displayed, in the virtual file listing display of the file management system of PROVIDE A FILE MANAGEMENT SYSTEM WITH THE CAPABILITY TO DISPLAY VIRTUAL FILE LISTINGS OPERATION 303.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the client associated with the files, and/or documents.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the project associated with the files, and/or documents.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the type of client, or project, associated with the files, and/or documents. For instance, as one specific illustrative example, files, and/or documents, associated with tax preparation clients are identified, grouped, and/or displayed in one virtual file listing while files, and/or documents, associated with bookkeeping clients are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the subject matter of the files, and/or documents. For instance, as one specific illustrative example, files, and/or documents, that are profit and loss documents are identified, grouped, and/or displayed in one virtual file listing while files, and/or documents that are quarterly balance sheet documents are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the business type, and/or the client type, associated with the files, and/or documents. For instance, as one specific illustrative example, files, and/or documents, associated with retail businesses or clients are identified, grouped, and/or displayed in one virtual file listing while files, and/or documents, associated with law practices or clients are identified, grouped, and/or displayed, in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the size of the business, and/or client. For instance, as one specific illustrative example, files, and/or documents, associated with 10 million dollar or more revenue businesses or clients are identified, grouped, and/or displayed in one virtual file listing while files, and/or documents, associated with 10 thousand dollar revenue or less businesses or clients are identified, grouped, and/or displayed in another virtual file listing. As another example, payroll files, and/or documents, associated with 20 or less employee businesses or clients are identified, grouped, and/or displayed in one virtual file listing while files, and/or documents, associated with 5,000 or more employee businesses or clients are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on a time frame, trigger/cut-off date, or threshold age. For instance, as one specific illustrative example, files, and/or documents, dated before a change in statutory regulations/forms/requirements are identified, grouped, and/or displayed in one virtual file listing while files, and/or documents, dated after a change in statutory regulations/forms/requirements are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the stage of an identified/associated process to which the files, and/or documents, relate. For instance, as one specific illustrative example, files, and/or documents, associated with pending patent applications are identified, grouped, and/or displayed in one virtual file listing while files, and/or documents, associated with issued patents are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on results obtained. For instance, as one specific illustrative example, files, and/or documents, associated with abandoned patent applications are identified, grouped, and/or displayed in one virtual file listing while files, and/or documents, associated with issued patents are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the file, and/or document, type such as a company file, and/or document, a backup file, and/or document, an account file, and/or document, etc.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on the version of the application associated with the file, and/or document.

In various embodiments, the virtual file listing display parameters of DEFINE ONE OR MORE VIRTUAL FILE LISTING DISPLAY PARAMETERS OPERATION 307 include, but are not limited to, virtual file listing display parameters indicating the files, and/or documents, are to be identified, grouped, and/or displayed, based, at least in part, on access restrictions and/or allowed access to the files, and/or documents. For instance, as one specific illustrative example, files, and/or documents, that should be viewed, and/or made accessible, by administrative staff are identified, grouped, and/or displayed in one virtual file listing while files, and/or documents, that should be viewed, and/or made accessible, by managers are identified, grouped, and/or displayed in another virtual file listing.

In various embodiments, the virtual file listing display parameters of DEFINE ONE OR MORE VIRTUAL FILE LISTING DISPLAY PARAMETERS OPERATION 307 include, but are not limited to, any other virtual file listing display parameters, or combinations of virtual file listing display parameters, indicating how the related files, and/or documents, are to be identified, grouped, and/or displayed, as discussed herein, and/or known in the art at the time of filing, and/or as developed after the time of filing.

In one embodiment, one or more virtual file listing display parameters are selected and/or defined by the user of process for automatic creation of customer lists and virtual file listing displays 300.

In one embodiment, one or more of the virtual file listing display parameters are selected and/or defined by the user of process for automatic creation of customer lists and virtual file listing displays 300 via a user interface display and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 3, in one embodiment, one or more of the virtual file listing display parameters are selected and/or defined by the provider of process for automatic creation of customer lists and virtual file listing displays 300.

In one embodiment, data representing the one or more virtual file listing display parameters is stored under the direction of one or more processors, such as CPU 101 and/or CPU 121 of FIG. 1, associated with one or more computing systems, such as user computing system 100 and/or provider computing system 120 of FIG. 1.

Returning to FIG. 3, in one embodiment, once one or more virtual file listing display parameters are selected and/or defined that determine how related files, and/or documents, will be identified, grouped, and/or otherwise displayed in the virtual file listing display of the file management system of PROVIDE A FILE MANAGEMENT SYSTEM WITH THE CAPABILITY TO DISPLAY VIRTUAL FILE LISTINGS OPERATION 303 at DEFINE ONE OR MORE VIRTUAL FILE LISTING DISPLAY PARAMETERS OPERATION 307, process flow proceeds to DESIGNATE ONE OR MORE DATA STORAGE SYSTEMS TO BE SCANNED OPERATION 309.

In one embodiment, at DESIGNATE ONE OR MORE DATA STORAGE SYSTEMS TO BE SCANNED OPERATION 309 the user designates one or more data storage systems, locations, and/or folders where the user stores the client and/or project files, documents, and/or data, that is to be scanned and/or processed by process for automatic creation of customer lists and virtual file listing displays 300.

In one embodiment, at DESIGNATE ONE OR MORE DATA STORAGE SYSTEMS TO BE SCANNED OPERATION 309 the user designates one or more data storage systems, locations, and/or folders where the user stores the client and/or project files, documents, previously created by the user through the one or more associated data management applications. As noted above, in various embodiments, the user has previously stored the client and/or project files, documents, in one or more locations, and/or folders, associated one or more data storage systems using his, or her, own data storage and organization scheme.

As used herein, the term "data storage system" includes, but is not limited to, a hard drive, a disk drive, a network drive, any data storage device, a designated server system or computing system, or a designated portion of one or more server systems or computing systems, any database, or distributed database, or external and/or portable hard drive, and/or any dedicated mass storage device implemented in software, hardware, or a combination of hardware and software, a web-based data storage system, and/or any memory. Herein, a memory refers to a volatile memory, a non-volatile memory, or any combination of the two.

In one embodiment, once the user designates one or more data storage systems, locations, and/or folders where the user stores the client and/or project files, documents, and/or data, that is to be scanned and/or processed by process for automatic creation of customer lists and virtual file listing displays 300 at DESIGNATE ONE OR MORE DATA STORAGE SYSTEMS TO BE SCANNED OPERATION 309 process flow proceeds to SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311.

In one embodiment, at SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311 the one or more designated data storage systems, locations, and/or folders, of DESIGNATE ONE OR MORE DATA STORAGE SYSTEMS TO BE SCANNED OPERATION 309 are scanned in accordance with the selected client list determination framework of A USER SELECTS A CLIENT LIST DETERMINATION FRAMEWORK OPERATION 305 and/or using the one or more virtual file listing display parameters of DEFINE ONE OR MORE VIRTUAL FILE LISTING DISPLAY PARAMETERS OPERATION 307.

In one embodiment, at SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311 the one or more designated data storage systems, locations, and/or folders, of DESIGNATE ONE OR MORE DATA STORAGE SYSTEMS TO BE SCANNED OPERATION 309 are scanned in accordance with the selected client list determination framework of A USER SELECTS A CLIENT LIST DETERMINATION FRAMEWORK OPERATION 305 and/or using the one or more virtual file listing display parameters of DEFINE ONE OR MORE VIRTUAL FILE LISTING DISPLAY PARAMETERS OPERATION 307 under the direction of one or more processors, such as CPU 101 and/or CPU 121 of FIG. 1, associated with one or more computing systems, such as user computing system 100 and/or provider computing system 120 of FIG. 1.

Returning to FIG. 3, in one embodiment, once the one or more designated data storage systems, locations, and/or folders, of DESIGNATE ONE OR MORE DATA STORAGE SYSTEMS TO BE SCANNED OPERATION 309 are scanned in accordance with the selected client list determination framework of A USER SELECTS A CLIENT LIST DETERMINATION FRAMEWORK OPERATION 305 and/or using the one or more virtual file listing display parameters of DEFINE ONE OR MORE VIRTUAL FILE LISTING DISPLAY PARAMETERS OPERATION 307 at SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311 process flow proceeds to CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313.

In one embodiment, at CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313, as a result of the scan of SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311, the user's clients, and/or projects, are identified in accordance with the client list determination framework of A USER SELECTS A CLIENT LIST DETERMINATION FRAMEWORK OPERATION 305 and a user client list, and/or user project list, is generated.

In one embodiment, at CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313, as a result of the scan of SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311, the user's clients, and/or projects, are identified in accordance with the client list determination framework of A USER SELECTS A CLIENT LIST DETERMINATION FRAMEWORK OPERATION 305 and a user client list, and/or user project list, is generated using one or more processors, such as CPU 101 and/or CPU 121 of FIG. 1, associated with one or more computing systems, such as user computing system 100 and/or provider computing system 120 of FIG. 1.

Returning to FIG. 3, in one embodiment, at CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313 the user client list, and/or user project list, is displayed through the file management system of PROVIDE A FILE MANAGEMENT SYSTEM WITH THE CAPABILITY TO DISPLAY VIRTUAL FILE LISTINGS OPERATION 303.

As noted above, FIG. 5 shows one illustrative example of a virtual file listing display 503 provided as part of a file manager display 501 provided at PROVIDE A FILE MANAGEMENT SYSTEM WITH THE CAPABILITY TO DISPLAY VIRTUAL FILE LISTINGS OPERATION 303. As seen in FIG. 5, virtual file listing display 503 includes client list 507 as would be created at CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313.

In one embodiment, once the user's clients, and/or projects, are identified in accordance with the client list determination framework of A USER SELECTS A CLIENT LIST DETERMINATION FRAMEWORK OPERATION 305 and a user client list, and/or user project list, is generated at CREATE/DISPLAY A CLIENT/PROJECT LISTING THROUGH THE FILE MANAGEMENT SYSTEM BASED ON SCAN RESULTS AND IDENTIFIED CLIENTS/PROJECTS OPERATION 313, process flow proceeds to CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAMETERS OPERATION 315.

In one embodiment, at CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAMETERS OPERATION 315, as a result of the scan of SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311, one or more related files, and/or documents, are identified, virtually grouped, and/or virtually displayed, based on the defined, and/or selected, virtual file listing display parameters of DEFINE ONE OR MORE VIRTUAL FILE LISTING DISPLAY PARAMETERS OPERATION 307.

In one embodiment, at CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAM- ETERS OPERATION 315, as a result of the scan of SCAN THE DESIGNATED DATA STORAGE SYSTEMS IN ACCORDANCE WITH THE CLIENT LIST DETERMINATION FRAMEWORK AND USING ONE OR MORE VIRTUAL FILE LISTING PARAMETERS OPERATION 311, one or more related files, and/or documents, are identified, virtually grouped, and/or virtually displayed, based on the defined, and/or selected, virtual file listing display parameters of DEFINE ONE OR MORE VIRTUAL FILE LISTING DISPLAY PARAMETERS OPERATION 307 under the direction of one or more processors, such as CPU 101 and/or CPU 121 of FIG. 1, associated with one or more computing systems, such as user computing system 100 and/or provider computing system 120 of FIG. 1.

Returning to FIG. 3, in one embodiment, at CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAMETERS OPERATION 315, one or more related files, and/or documents, are identified, virtually grouped, and/or virtually displayed, based on the defined, and/or selected, virtual file listing display parameters, however, the physical memory locations of the data representing the files, and/or documents, listed in the one or more virtual file listing displays is not changed, nor are any changes made to the user's existing underlying data storage and organization system/scheme.

As noted above, FIG. 5 shows one illustrative example of a virtual file listing display 503 provided as part of a file manager display 501 provided at PROVIDE A FILE MANAGEMENT SYSTEM WITH THE CAPABILITY TO DISPLAY VIRTUAL FILE LISTINGS OPERATION 303.

As seen in FIG. 5, virtual file listing display 503 includes virtual file listings, such as exemplary virtual file listing 505 that include the name of the file, the physical location of the file, the last modified date associated with the file, and the application type and version that created, uses, and/or is associated with, the file.

As also seen in FIG. 5, in this specific illustrative example, virtual file listing display 503 includes file listings grouped by the associated client and file type using one or more virtual file listing display parameters that include, but are not limited to, virtual file listing display parameters indicating the files, and/or documents, are to be identified, grouped, and/or displayed, based, at least in part, on the file, and/or document, type such as a company file, and/or document, a backup file, and/or document, an account file, and/or document, etc.

Those of skill in the art will readily recognize that FIG. 5 shows but one example of a file manager display 501 and virtual file listing display 503. Consequently, FIG. 5 is presented and discussed for illustrative purposes and is not intended to limit the scope of the claims presented below.

Returning to FIG. 5, in one embodiment, the user is provided the capability to manually modify and/or customize how one or more related files, and/or documents, are identified, virtually grouped, and/or virtually displayed, and therefore modify and/or customize one or more virtual file listing displays.

Figure 6:
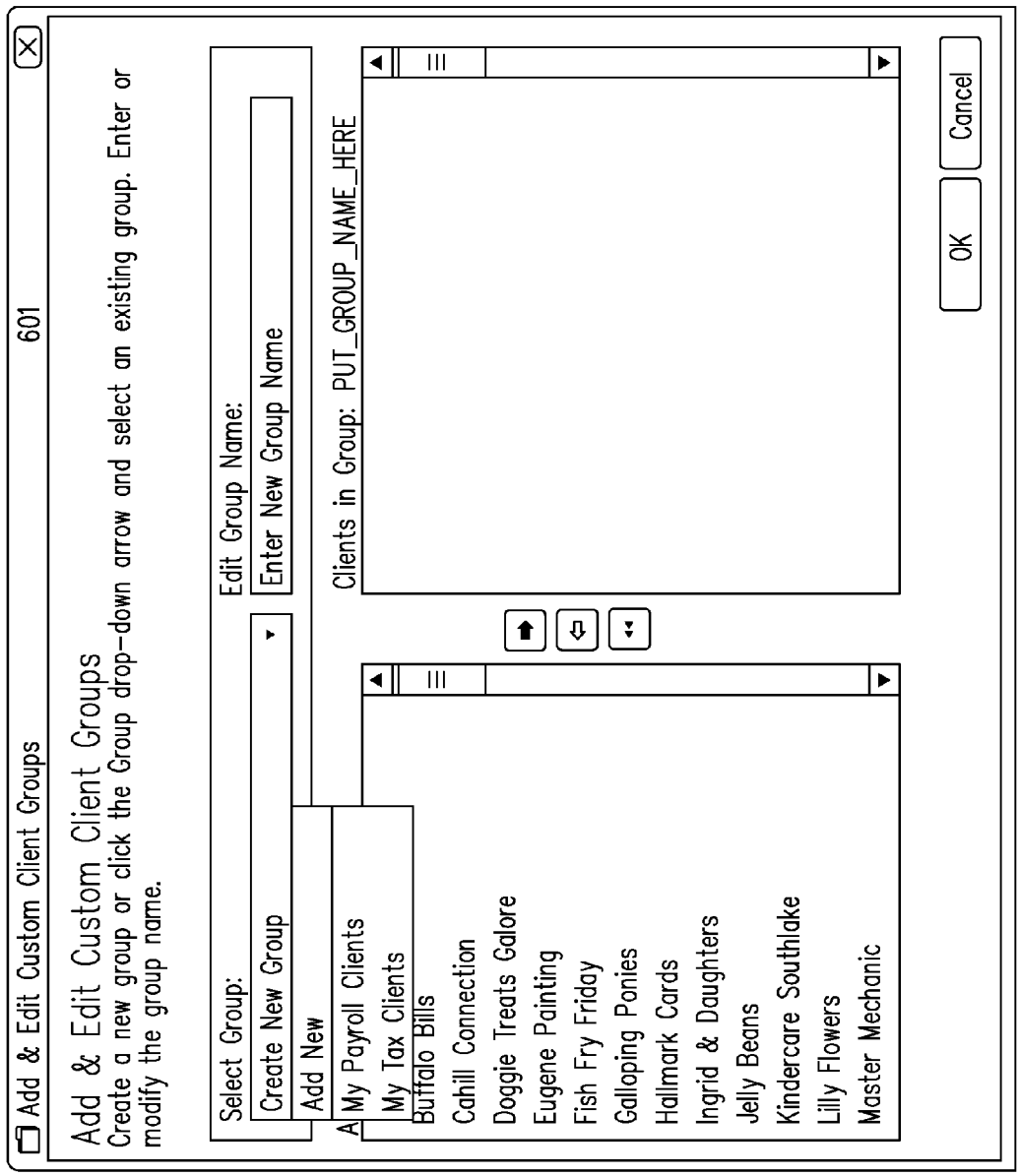
FIG. 6 is an illustrative example of a user interface display for modifying, creating, and displaying, a customized virtual file listing display in accordance with one embodiment.

FIG. 6 shows one illustrative example of one embodiment of a virtual file listing display customization interface 601 used to modify and/or customize how one or more related files, and/or documents, are identified, virtually grouped, and/or or virtually displayed at CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAMETERS OPERATION 315 (FIG. 3).

In one embodiment, once one or more related files, and/or documents, are identified, virtually grouped, and/or virtually displayed, based on the defined, and/or selected, virtual file listing display parameters of DEFINE ONE OR MORE VIRTUAL FILE LISTING DISPLAY PARAMETERS OPERATION 307 at CREATE/DISPLAY ONE OR MORE VIRTUAL FILE LISTINGS THROUGH THE FILE MANAGEMENT SYSTEM IN ACCORDANCE WITH THE VIRTUAL FILE LISTING FRAMEWORK AND/OR THE ONE OR MORE VIRTUAL FILE LISTING PARAMETERS OPERATION 315 process flow proceeds to EXIT OPERATION 330.

In one embodiment, at EXIT OPERATION 330 process for automatic creation of customer lists and virtual file listing displays 300 is exited to await new data and/or instructions.

In the discussion above, certain aspects of one embodiment include process steps or operations or instructions described herein for illustrative purposes in a particular order or grouping. However, the particular order or groupings shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using one embodiment of process for automatic creation of customer lists and virtual file listing displays 300, client and/or project lists are automatically created based on actual data, files, and/or documents, in the user's data system. In addition, using process for automatic creation of customer lists and virtual file listing displays 300, customizable virtual related file listings are created to display listings of related files, and/or documents, without physically changing the current memory location of the data representing the files, and/or documents, or making any changes to user's existing underlying data storage and organization system/scheme.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "launching", "monitoring", "obtaining", "opening", "processing", "providing", "receiving", "requesting", "requiring", "saving", "selecting", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s and discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automatic creation of customer lists and virtual file listing displays comprising:

providing a file management system, the file management system being associated with one or more parent applications;

defining one or more virtual file listing display parameters;

designating one or more data storage systems to be scanned, the one or more data storage systems including data representing files associated with the one or more parent applications, the data representing files associated with the one or more parent applications being stored in one or more origin physical memory locations in the one or more data storage systems;

scanning the designated one or more data storage systems to identify the data representing files associated with the one or more parent applications;

generating a client and/or project list for a user based, at least in part, on the scan of the data representing files associated with the one or more parent applications;

generating one or more virtual file listing displays based, at least in part, on the scan of the data representing files associated with the one or more parent applications, the one or more virtual file listing displays including a listing of one or more of the identified files associated with the one or more parent applications, the one or more virtual file listing displays allowing a user to select and access the listed files associated with the one or more parent applications, the one or more virtual file listing displays being generated such that the data representing the listed files associated with the one or more parent applications remains in the origin physical memory locations in the one or more data storage systems; and displaying the one or more virtual file listing displays through the file management system.

2. The method for automatic creation of customer lists and virtual file listing displays of claim 1, wherein;

the one or more virtual file listing displays of the file management system includes a data field for data indicating a parent application associated with each of the listed files associated with the one or more parent applications in the one or more virtual file listing displays.

3. The method for automatic creation of customer lists and virtual file listing displays of claim 1, further comprising;

a user selecting one or more of the listed files associated with the one or more parent applications through the one or more virtual file listing displays of the file management system;

the file management system launching one or more parent applications associated with the user selected files; and the one or more parent applications associated with the user selected files accessing the data representing the selected files from the one or more origin physical memory locations in the one or more data storage systems.

4. The method for automatic creation of customer lists and virtual file listing displays of claim 3, wherein;

prior to the file management system launching one or more parent applications associated with the user selected files, the user is required to provide a global file management system login/password and/or a username associated with the user to the file management system.

5. The method for automatic creation of customer lists and virtual file listing displays of claim 1, wherein;

the one or more virtual file listing display parameters include virtual file listing display parameters indicating the identified files associated with the one or more parent applications are to be listed and/or displayed in the one or more virtual file listing displays according to a client, and/or customer, and/or company associated with the identified files associated with the one or more parent applications.

6. The method for automatic creation of customer lists and virtual file listing displays of claim 1, wherein;

the one or more virtual file listing display parameters include virtual file listing display parameters indicating the identified files associated with the one or more parent applications are to be listed and/or displayed in the one or more virtual file listing displays according to a project associated with the identified files associated with the one or more parent applications.

7. The method for automatic creation of customer lists and virtual file listing displays of claim 1, wherein;

the one or more virtual file listing display parameters include virtual file listing display parameters indicating the identified files associated with the one or more parent applications are to be listed and/or displayed in the one or more virtual file listing displays according to a file type associated with the identified files associated with the one or more parent applications.

8. The method for automatic creation of customer lists and virtual file listing displays of claim 1, wherein;

the one or more virtual file listing display parameters include virtual file listing display parameters indicating the identified files associated with the one or more parent applications are to be listed and/or displayed in the one or more virtual file listing displays according to access restrictions associated with the identified files associated with the one or more parent applications.

9. The method for automatic creation of customer lists and virtual file listing displays of claim 1, wherein;

the one or more virtual file listing display parameters include at least one virtual file listing display parameter selected from the group of virtual file listing display parameters consisting of:

a virtual file listing display parameter indicating the identified files associated with the one or more parent applications are to be listed and/or displayed in the one or more virtual file listing displays according the type of client associated with the identified files associated with the one or more parent applications;

a virtual file listing display parameter indicating the identified files associated with the one or more parent applications are to be listed and/or displayed in the one or more virtual file listing displays according the subject matter associated with the identified files associated with the one or more parent applications;

a virtual file listing display parameter indicating the identified files associated with the one or more parent applications are to be listed and/or displayed in the one or more virtual file listing displays according the business type associated with the identified files associated with the one or more parent applications;

a virtual file listing display parameter indicating the identified files associated with the one or more parent applications are to be listed and/or displayed in the one or more virtual file listing displays according the size of the business associated with the identified files associated with the one or more parent applications;

a virtual file listing display parameter indicating the identified files associated with the one or more parent applications are to be listed and/or displayed in the one or more virtual file listing displays according a time frame associated with the identified files associated with the one or more parent applications;

a virtual file listing display parameter indicating the identified files associated with the one or more parent applications are to be listed and/or displayed in the one or more virtual file listing displays according a processing stage associated with the identified files associated with the one or more parent applications;

a virtual file listing display parameter indicating the identified files associated with the one or more parent applications are to be listed and/or displayed in the one or more virtual file listing displays according results associated with the identified files associated with the one or more parent applications; and a virtual file listing display parameter indicating the identified files associated with the one or more parent applications are to be listed and/or displayed in the one or more virtual file listing displays according to the version of the parent application associated with the identified files associated with the one or more parent applications.

10. A computing system implemented process for automatic creation of customer lists and virtual file listing displays comprising:

using one or more processors associated with one or more computing systems to provide a file management system, the file management system being associated with one or more parent applications, defining one or more virtual file listing display parameters;

designating one or more data storage systems to be scanned, the one or more data storage systems including data representing files associated with the one or more parent applications, the data representing files associated with the one or more parent applications being stored in one or more origin physical memory locations in the one or more data storage systems;

using one or more processors associated with one or more computing systems to scan the designated one or more data storage systems to identify the data representing files associated with the one or more parent applications;

using one or more processors associated with one or more computing systems to generate a client and/or project list for a user based, at least in part, on the scan of the data representing files associated with the one or more parent applications;

using one or more processors associated with one or more computing systems to generate one or more virtual file listing displays based, at least in part, on the scan of the data representing files associated with the one or more parent applications, the one or more virtual file listing displays including a listing of one or more of the identified files associated with the one or more parent applications, the one or more virtual file listing displays allowing a user to select and access the listed files associated with the one or more parent applications, the one or more virtual file listing displays being generated such that the data representing the listed files associated with the one or more parent applications remains in the origin physical memory locations in the one or more data storage systems; and using one or more processors associated with one or more computing systems to display the one or more virtual file listing displays through the file management system.

11. The computing system implemented process for automatic creation of customer lists and virtual file listing displays of claim 10, wherein;

the one or more virtual file listing displays of the file management system includes a data field for data indicating a parent application associated with each of the listed files associated with the one or more parent applications in the one or more virtual file listing displays.

12. The computing system implemented process for automatic creation of customer lists and virtual file listing displays of claim 10, further comprising;

a user selecting one or more of the listed files associated with the one or more parent applications through the one or more virtual file listing displays of the file management system;

using one or more processors associated with one or more computing systems to launch one or more parent applications associated with the user selected files through the file management system; and using one or more processors associated with one or more computing systems to provide the one or more parent applications associated with the user selected files access to the data representing the selected files from the one or more origin physical memory locations in the one or more data storage systems.

13. The computing system implemented process for automatic creation of customer lists and virtual file listing displays of claim 12 wherein;

prior to the file management system launching one or more parent applications associated with the user selected files, the user is required to provide a global file management system login/password and/or a username associated with the user to the file management system.

14. The computing system implemented process for automatic creation of customer lists and virtual file listing displays of claim 10, wherein;

the one or more virtual file listing display parameters include virtual file listing display parameters indicating the identified files associated with the one or more parent applications are to be listed and/or displayed in the one or more virtual file listing displays according to a client, and/or customer, and/or company associated with the identified files associated with the one or more parent applications.

15. The computing system implemented process for automatic creation of customer lists and virtual file listing displays of claim 10, wherein;

the one or more virtual file listing display parameters include virtual file listing display parameters indicating the identified files associated with the one or more parent applications are to be listed and/or displayed in the one or more virtual file listing displays according to a project associated with the identified files associated with the one or more parent applications.

16. The computing system implemented process for automatic creation of customer lists and virtual file listing displays of claim 10, wherein;

the one or more virtual file listing display parameters include virtual file listing display parameters indicating the identified files associated with the one or more parent applications are to be listed and/or displayed in the one or more virtual file listing displays according to a file type associated with the identified files associated with the one or more parent applications.

17. The computing system implemented process for automatic creation of customer lists and virtual file listing displays of claim 10, wherein;

the one or more virtual file listing display parameters include virtual file listing display parameters indicating the identified files associated with the one or more parent applications are to be listed and/or displayed in the one or more virtual file listing displays according to access restrictions associated with the identified files associated with the one or more parent applications.

18. The computing system implemented process for automatic creation of customer lists and virtual file listing displays of claim 10, wherein;

the one or more virtual file listing display parameters include at least one virtual file listing display parameter selected from the group of virtual file listing display parameters consisting of:

a virtual file listing display parameter indicating the identified files associated with the one or more parent applications are to be listed and/or displayed in the one or more virtual file listing displays according the type of client associated with the identified files associated with the one or more parent applications;

a virtual file listing display parameter indicating the identified files associated with the one or more parent applications are to be listed and/or displayed in the one or more virtual file listing displays according the subject matter associated with the identified files associated with the one or more parent applications;

a virtual file listing display parameter indicating the identified files associated with the one or more parent applications are to be listed and/or displayed in the one or more virtual file listing displays according the business type associated with the identified files associated with the one or more parent applications;

a virtual file listing display parameter indicating the identified files associated with the one or more parent applications are to be listed and/or displayed in the one or more virtual file listing displays according the size of the business associated with the identified files associated with the one or more parent applications;

a virtual file listing display parameter indicating the identified files associated with the one or more parent applications are to be listed and/or displayed in the one or more virtual file listing displays according a time frame associated with the identified files associated with the one or more parent applications;

a virtual file listing display parameter indicating the identified files associated with the one or more parent applications are to be listed and/or displayed in the one or more virtual file listing displays according a processing stage associated with the identified files associated with the one or more parent applications;

a virtual file listing display parameter indicating the identified files associated with the one or more parent applications are to be listed and/or displayed in the one or more virtual file listing displays according results associated with the identified files associated with the one or more parent applications; and a virtual file listing display parameter indicating the identified files associated with the one or more parent applications are to be listed and/or displayed in the one or more virtual file listing displays according to the version of the parent application associated with the identified files associated with the one or more parent applications.

19. A system for automatic creation of customer lists and virtual file listing displays comprising:
   one or more computing systems implementing at least part of one or more parent applications;
   one or more data storage systems, the one or more data storage systems including data representing files associated with the one or more parent applications, the data representing files associated with the one or more parent applications being stored in one or more origin physical memory locations in the one or more data storage systems;
   a file management system, the file management system being associated with the one or more parent applications; and
   one or more processors associated with one or more computing systems, the one or more computing systems implementing at least part of a process for automatic creation of customer lists and virtual file listing displays, the process for automatic creation of customer lists and virtual file listing displays including:
   designating the one or more data storage systems to be scanned;
   using the one or more processors associated with the one or more computing systems to scan the designated one or more data storage systems to identify the data representing files associated with the one or more parent applications;
   using the one or more processors associated with the one or more computing systems to generate a client and/or project list for a user based, at least in part, on the scan of the data representing files associated with the one or more parent applications;
   using the one or more processors associated with the one or more computing systems to generate one or more virtual file listing displays based, at least in part, on the scan of the data representing files associated with the one or more parent applications, the one or more virtual file listing displays including a listing of one or more of the identified files associated with the one or more parent applications, the one or more virtual file listing displays allowing a user to select and access the listed files associated with the one or more parent applications, the one or more virtual file listing displays being generated such that the data representing the listed files associated with the one or more parent applications remains in the origin physical memory locations in the one or more data storage systems; and
   using the one or more processors associated with the one or more computing systems to display the one or more virtual file listing displays through the file management system.

20. The system for automatic creation of customer lists and virtual file listing displays of claim 19, wherein;
   the one or more virtual file listing displays of the file management system includes a data field for data indicating a parent application associated with each of the listed files associated with the one or more parent applications in the one or more virtual file listing displays.

21. The system for automatic creation of customer lists and virtual file listing displays of claim 19, further comprising;
   a user selecting one or more of the listed files associated with the one or more parent applications through the one or more virtual file listing displays of the file management system;
   using the one or more processors associated with the one or more computing systems to launch one or more parent applications associated with the user selected files through the file management system; and
   using the one or more processors associated with the one or more computing systems to provide the one or more parent applications associated with the user selected files access to the data representing the selected files from the one or more origin physical memory locations in the one or more data storage systems.

22. The system for automatic creation of customer lists and virtual file listing displays of claim 21, wherein;
   prior to the file management system launching one or more parent applications associated with the user selected files, the user is required to provide a global file management system login/password and/or a username associated with the user to the file management system.

23. The system for automatic creation of customer lists and virtual file listing displays of claim 19, wherein;
   the one or more virtual file listing display parameters include virtual file listing display parameters indicating the identified files associated with the one or more parent applications are to be listed and/or displayed in the one or more virtual file listing displays according to a client, and/or customer, and/or company associated with the identified files associated with the one or more parent applications.

24. The system for automatic creation of customer lists and virtual file listing displays of claim 19, wherein;
   the one or more virtual file listing display parameters include virtual file listing display parameters indicating the identified files associated with the one or more parent applications are to be listed and/or displayed in the one or more virtual file listing displays according to a project associated with the identified files associated with the one or more parent applications.

25. The system for automatic creation of customer lists and virtual file listing displays of claim 19, wherein;
   the one or more virtual file listing display parameters include virtual file listing display parameters indicating the identified files associated with the one or more parent applications are to be listed and/or displayed in the one or more virtual file listing displays according to a file type associated with the identified files associated with the one or more parent applications.

26. The system for automatic creation of customer lists and virtual file listing displays of claim 19, wherein;
   the one or more virtual file listing display parameters include virtual file listing display parameters indicating the identified files associated with the one or more parent applications are to be listed and/or displayed in the one or more virtual file listing displays according to access restrictions associated with the identified files associated with the one or more parent applications.

27. The system for automatic creation of customer lists and virtual file listing displays of claim 19, wherein;
   the one or more virtual file listing display parameters include at least one virtual file listing display parameter selected from the group of virtual file listing display parameters consisting of:

a virtual file listing display parameter indicating the identified files associated with the one or more parent applications are to be listed and/or displayed in the one or more virtual file listing displays according the type of client associated with the identified files associated with the one or more parent applications;

a virtual file listing display parameter indicating the identified files associated with the one or more parent applications are to be listed and/or displayed in the one or more virtual file listing displays according the subject matter associated with the identified files associated with the one or more parent applications;

a virtual file listing display parameter indicating the identified files associated with the one or more parent applications are to be listed and/or displayed in the one or more virtual file listing displays according the business type associated with the identified files associated with the one or more parent applications;

a virtual file listing display parameter indicating the identified files associated with the one or more parent applications are to be listed and/or displayed in the one or more virtual file listing displays according the size of the business associated with the identified files associated with the one or more parent applications;

a virtual file listing display parameter indicating the identified files associated with the one or more parent applications are to be listed and/or displayed in the one or more virtual file listing displays according a time frame associated with the identified files associated with the one or more parent applications;

a virtual file listing display parameter indicating the identified files associated with the one or more parent applications are to be listed and/or displayed in the one or more virtual file listing displays according a processing stage associated with the identified files associated with the one or more parent applications;

a virtual file listing display parameter indicating the identified files associated with the one or more parent applications are to be listed and/or displayed in the one or more virtual file listing displays according results associated with the identified files associated with the one or more parent applications; and a virtual file listing display parameter indicating the identified files associated with the one or more parent applications are to be listed and/or displayed in the one or more virtual file listing displays according to the version of the parent application associated with the identified files associated with the one or more parent applications.

* * * * *